Aug. 26, 1958 W. A. MAUDE 2,848,884
GEAR
Filed Nov. 17, 1955

Inventor:
William A. Maude
by, Richard E. Horley
His Attorney

United States Patent Office 2,848,884
Patented Aug. 26, 1958

2,848,884

GEAR

William A. Maude, Lynn, Mass., assignor to General Electric Company, a corporation of New York Application November 17, 1955, Serial No. 547,352

3 Claims. (Cl. 64—30)

This invention pertains to an improved gear and particularly to a gear having an elastically deformable material between elements thereof.

It is a primary object of this invention to provide a new and improved gear which will absorb shock and vibration and limit the torque which can be transmitted therethrough.

It is a further object of this invention to provide a new and improved gear which is capable of use to eliminate backlash and concomitant excessive wear of gear teeth due to inaccurate alignment.

It is a still further object of this invention to provide an improved gear which lends itself to quick assembly without using cumbersome techniques or a multiplicity of parts to assemble and hold the elastically deformable element between the rigid elements of the gear.

In a preferred embodiment, this invention takes the form of a gear having a cylindrical hub member and a cylindrical ring gear member concentrically arranged with respect to each other. One of the members has annular grooves in the peripheral surface opposite the concentric surface of the other member. Elastically deformable means preferably in the form of cylindrical rubber O-rings are placed in the grooves where they are to be compressed between the members to an extent sufficient to frictionally engage both the opposed concentric surfaces of the members. The elastically deformable means are of such dimensions so as to provide a resiliently cushioned separation of the members to absorb shock and vibration, to permit radial movement between the parts where there is inaccuracy in alignments between the mechanical portions connected to the members, and to permit a slipping or overriding between the elastically deformable means and either of the members to thereby limit the torque which can be transmitted through the gear. By providing annular grooves in one member, the elastically deformable means are held in proper relative position during the assembly of the members in concentric array and thus eliminates the necessity of bonding the elastically deformable means to the hub member by vulcanization, freezing, or other like process. Likewise, by providing grooves in the periphery of one of the members and using O-rings of proper dimension, it becomes unnecessary to provide separate attaching parts to either member to act therewith to hold the members in assembled array with the elastically deformable means in compression.

The features of this invention which are believed to be novel are set forth with particularity in the appended claims. The invention itself may be better understood as to organization and construction as well as to further objects and advantages by reference to the following description taken in conjunction with the accompanying drawings in which:

Figure 1:
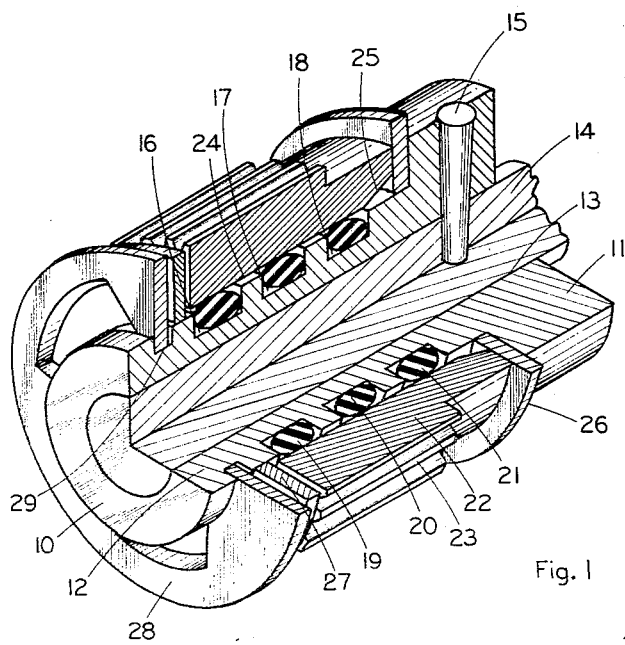
Figure 1 is a perspective of the gear in assembled array with a right-angle sectional cutout.

In the embodiment of Figure 1, a gear is shown comprising a cylindrical hub member 10 having a shoulder portion 11, a reduced portion 12, and a cylindrical bore 13 therethrough into which a shaft 14 extends to support the gear. The hub member may be keyed for rotation with the shaft by some suitable means such as a pin 15 which extends through aligned radial openings in the shoulder portion of the hub and the shaft or the hub member may be a shaft or a shaft extension so that keying becomes unnecessary. In the outer periphery of the reduced portion 12 of the hub member are cut a number of annular grooves 16, 17, and 18 having a square or rectangular cross section into which elastically deformable O-rings 19, 20, and 21 are set for compression therewithin. Mounted concentrically about the reduced portion of the hub member and cooperating therewith to compress the O-rings is a cylindrical ring gear 22 having gear teeth 23 machined in any well-known manner in the outer periphery thereof. A smooth surfaced central bore 24 extending through the ring gear is countersunk at one end to present a tapered surface 25 which eases the assembly of the parts and reduces the likelihood of shearing the O-rings during the assembly.

To insulate the ring gear 22 from contact with the shoulder of the hub 10, a washer 26 of plastic material or elastic material may be used. Likewise, a second similar washer 27 may be mounted on hub 10 at the opposite end of the ring gear to insulate the same from an E-ring 28 or other suitable locking means adapted to be set in an annular groove 29 proximate the end of the hub member remote from the shoulder portion.

Figure 2:
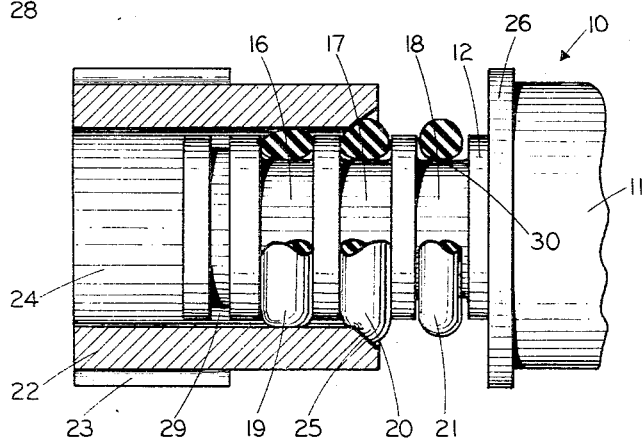
Figure 2 is an elevation of the gear in partial assembly with portions in section.

In the practice of this invention, the preferred O-rings are those which have an inner diameter less than the diameter of the hub 10 measured to the base of the grooves. At the same time, the diameter of the annulus of the O-ring must be greater than the depth of the groove where a square groove configuration is used such as shown in Figures 1 and 2. Where other groove configurations are used, the annulus of the O-ring must be of a dimension such that when placed in the groove, the annulus extends radially beyond the groove to present a deformable surface for frictional engagement with the ring gear member. Thus, each O-ring, such as O-ring 21 in Figure 2, having an inner diameter less than the diameter of hub 10 to base of a groove will in its position within the groove present a flattened inner surface to the base of the groove, such as surface 30 in groove 18, due to the tensional force caused by stretching the O-ring. During assembly, each of the O-rings, such as O-ring 20 in Figure 2, will be gradually compressed further into the grooves. After assembly of the ring gear 22 over the hub and O-rings, each O-ring, such as O-ring 19 in Figure 2, will be further compressed both within the groove and against the inner surface of the ring gear. Thus, the O-rings present frictional surfaces to the hub and ring gear members by virtue of the tensional force within the O-ring and compressive force of the members. In addition, the O-rings present a resiliently cushioned separation between the hub member 10 and ring gear 22 to thereby provide a shock or vibration absorption means. By absorbing the vibration or shock, the O-rings also reduce or eliminate resultant noises which might have been otherwise produced. The benefit of this absorption can also be obtained where there is a likelihood of continuous rapid oscillations or vibrations of one of the parts of sufficient magnitude to create sounds which may be described as a continuous chattering. Furthermore, because the O-rings present a resiliently cushioned separation between the hub member 10 and ring gear 22, a margin is provided which permits limited radial movement of the ring gear 22 with respect to hub member 10. Thus, in applications where ring gear 22 is mounted to be in engagement with another mating gear, not shown, so that the gear teeth of one is bottomed in the teeth of the other, the O-rings would compress further to permit the gears to run without binding, thereby eliminating undesirable backlash.

The magnitude of the torque which can be transmitted from one member of the gear will depend entirely on the magnitude of the frictional torque developed between the surfaces of the hub, the ring gear, and the O-ring. This may be varied by selecting materials of various frictional qualities or providing O-rings of various dimensions to vary the tensive and compressive forces acting on the groove and ring gear or by providing a groove of various configurations adapted to give various surface areas in contact with the O-ring.

The assembly of the gear is effectuated as follows: referring to Figure 2, an annular washer 26 of rectangular cross section is moved over the end of hub member 10 and moved to the opposite end of the reduced portion 12 until contact is made with shoulder portion 11. A first elastically deformable O-ring 19 having an inner diameter less than the diameter of the hub member 10 to the base of a groove, is stretched over the end of the hub member and rolled until it drops in the first groove 16. A second elastically deformable O-ring 20 is likewise stretched over the end of the hub member and rolled along the reduced portion thereof and over the first O-ring until it drops in the second groove 17. The step of placing the O-rings is repeated until all or any number of the grooves are filled. Thereafter, the ring gear 22 is moved over the reduced portion 12 of the hub member with the tapered surface 25 leading so as to allow the tapered surface to place each successive O-ring into a gradual compression as the ring gear moves to the position proximate the washer 26. To assure further that the O-rings will be brought into compression without shearing the radially extending portions thereof, it is deemed advisable to rotate the hub and ring gear members relative to each other during the relative axial movement of the parts. Having placed the ring gear in concentric array with the hub member and O-rings, an annular washer 27 is placed over the reduced portion of the hub member and an E-ring 28 or any suitable locking means is attached to the end of the hub member as in groove 29. The washers 26 and 27 may be of plastic material or elastically deformable to act as an insulating barrier between the shoulder portion 11, the E-ring 28, and the ring gear 22 to reduce further or eliminate transfer of shock and vibration and the noise resulting therefrom.

During the assembly of the ring gear on the hub member 10, the frictional contact between the O-rings and ring gear as well as the direct force applied parallel to the axis of the hub to the O-rings by the ring gear through its tapered surface 25 will tend to roll the O-rings along with the ring gear. This might result in bunching and uneven compression of the O-rings thus making control of torque limitation relatively unpredictable where no steps are taken to prevent such a result. By providing annular grooves, the O-rings are restrained from such movement thus providing an even distribution of frictional surfaces under controlled compression without the necessity of bonding the frictional elements to the hub member.

Thus, it is seen that an improved gear is provided which is simple in construction and uses a minimum number of parts capable of easy assembly without using cumbersome techniques. At the same time, the gear may be assembled from parts which may be standardized to have many other uses and which may be easily mass produced separately prior to assembly.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. A gear comprising a hub member and a ring gear member concentrically arranged with respect to each other, one of said members having axially spaced annular grooves therein, each of said grooves having side walls and a bottom surface, and a torque transmitting elastically deformable O-ring mounted in each of said grooves, said O-rings being in limited frictional engagement with said side walls and said bottom surface of said grooves and with the non-grooved member whereby a predetermined torque applied to one of said members will cause relative rotational movement between said members.

2. A gear comprising a hub member and a ring gear member concentrically arranged with respect to each other, said hub member having axially spaced annular grooves in the outer periphery thereof, each of said grooves having side walls and a bottom surface, and a torque transmitting elastically deformable ring member in each of said grooves, said elastically deformable ring member being in limited frictional engagement with said side walls and said bottom surface and with said ring gear member, said frictional engagement being greater with one of said members than with the other whereby a predetermined torque applied to one of said members will cause relative rotational movement between said members.

3. A gear comprising a hub member having axially spaced annular grooves in the outer periphery thereof, each of said grooves having side walls and a bottom surface, a ring gear member concentrically mounted on said hub member, and a torque transmitting rubber O-ring mounted in each of said grooves, the bottom surface of said grooved having a greater diameter than the inner diameter of said O-ring whereby said O-ring is in tensioned frictional engagement with said bottom surface, the outer diameter of said O-ring being greater than the inner diameter of said ring gear whereby said O-ring is in compressed frictional engagement with said ring gear, said O-rings being arranged to slip relative to one of said members upon application of excessive torque to one of said members.

References Cited in the file of this patent

UNITED STATES PATENTS

| | | |
|---|---|---|
| 2,209,774 | Huebsch | July 30, 1940 |
| 2,561,103 | Fawick | July 17, 1951 |
| 2,667,768 | Winkler et al. | Feb. 2, 1954 |
| 2,715,822 | Anderson | Aug. 25, 1955 |
| 2,751,987 | Kiekhaefer | June 26, 1956 |

FOREIGN PATENTS

| | | |
|---|---|---|
| 465,308 | Italy | Aug. 22, 1951 |
| 995,834 | France | Dec. 10, 1951 |

UNITED STATES PATENT OFFICE
CERTIFICATE OF CORRECTION

Patent No. 2,848,884                                              August 26, 1958

William A. Maude

It is hereby certified that error appears in the printed specification of the above numbered patent requiring correction and that the said Letters Patent should read as corrected below.

Column 4, line 49, for "grooved" read -- groove --.

Signed and sealed this 5th day of April 1960.

(SEAL)
Attest:

KARL H. AXLINE
Attesting Officer

ROBERT C. WATSON
Commissioner of Patents